(12) United States Patent
Bopp et al.

(10) Patent No.: US 8,276,849 B2
(45) Date of Patent: Oct. 2, 2012

(54) APPARATUS FOR SUPPORTING INSTRUMENTS IN AN INSTRUMENT PANEL

(75) Inventors: Jayson K. Bopp, Fishers, IN (US); Martin G. Fix, Indianapolis, IN (US); Philip I. Heidenreich, Noblesville, IN (US)

(73) Assignee: Raytheon Company, Waltham, MA (US)

( * ) Notice: Subject to any disclaimer, the term of this patent is extended or adjusted under 35 U.S.C. 154(b) by 783 days.

(21) Appl. No.: 12/366,148

(22) Filed: Feb. 5, 2009

(65) Prior Publication Data
US 2010/0078533 A1 Apr. 1, 2010

Related U.S. Application Data

(60) Provisional application No. 61/194,891, filed on Sep. 30, 2008.

(51) Int. Cl.
*B64C 1/00* (2006.01)
(52) U.S. Cl. .................. 244/129.1; 244/226; 248/27.1; 248/694; 73/756
(58) Field of Classification Search .............. 244/1 R, 244/129.1, 226; 248/27.1, 694; 73/31.04, 73/756, 700
See application file for complete search history.

(56) References Cited

U.S. PATENT DOCUMENTS

| | | | |
|---|---|---|---|
| 3,981,199 A | 9/1976 | Moore et al. | ............... 73/420 |
| 4,093,021 A | 6/1978 | Groom | |
| 4,312,041 A | 1/1982 | DeJonge | |
| 4,532,513 A | 7/1985 | Halvorson | |
| 4,699,208 A | 10/1987 | Wolf et al. | |
| 5,942,691 A | 8/1999 | Hopkins et al. | ............... 73/706 |
| 6,553,841 B1* | 4/2003 | Blouch | ............... 73/755 |
| 6,581,471 B1* | 6/2003 | Grudzien | ............... 73/753 |
| 7,178,390 B1 | 2/2007 | Kalovsky et al. | ............... 73/146 |
| 7,188,400 B1 | 3/2007 | Beseth et al. | |
| 7,806,143 B2* | 10/2010 | Taskar | ............... 137/884 |
| 2006/0060732 A1 | 3/2006 | Tannas, Jr. | |
| 2008/0094255 A1 | 4/2008 | Bethel | |

FOREIGN PATENT DOCUMENTS

| | | |
|---|---|---|
| DE | 35 17 149 | 5/1985 |
| EP | 0 098 090 | 6/1983 |
| GB | 1 274 311 | 1/1969 |
| WO | WO 98/21093 | 5/1998 |

(Continued)

OTHER PUBLICATIONS

PCT, Notification of Transmittal of the International Search Report and the Written Opinion of the International Searching Authority, International Application No. PCT/US2009/033374, 14 pages, Jan. 20, 2010.

(Continued)

*Primary Examiner* — John W Eldred
(74) *Attorney, Agent, or Firm* — Renner, Otto, Boisselle & Sklar, LLP

(57) ABSTRACT

According to one embodiment, a bracket configured to hold a pressure transducer comprises a body, a face plate, and one or more pressure fitting connectors. The body has a rear portion and a front portion that meet to form an angle less than 180 degrees. The face plate is coupled to the front portion of the body, and has a surface defining a plate aperture configured for a cable to pass through. The pressure fitting connectors are coupled to the rear portion of the body. Each pressure fitting connector is configured to receive a pressure hose.

20 Claims, 8 Drawing Sheets

FOREIGN PATENT DOCUMENTS

| WO | WO 03/080437 | 10/2003 |
|---|---|---|
| WO | WO 2007/086822 | 8/2007 |
| WO | WO 2008/040783 | 4/2008 |
| WO | WO 2008/101167 | 8/2008 |

OTHER PUBLICATIONS

Notification of Transmittal of the International Search Report and the Written Opinion of the International Searching Authority, International Application No. PCT/US2009/033371, Filing Date Jun. 2, 2009, 16 pages, Sep. 22, 2009.

PCT, Notification of Transmittal of the International Search Report and the Written Opinion of the International Searching Authority, or the Declaration, PCT Rule 44.1), International Application No. PCT/US2009/033381, 12 pages, Jul. 17, 2009.

PCT, Notification of Transmittal of the International Search Report and the Written Opinion of the International Searching Authority, or the Declaration, PCT Rule 44.1), International Application No. PCT/US2009/033376, 7 pages, Jul. 17, 2009.

Jayson K. Bopp; "Center Instrument Pedestal Display;" U.S. Appl. No. 12/366,451; 32 pages, filed Feb. 5, 2009.

Vicich, et al; "Aircraft Canister Design;" U.S. Appl. No. 12/366,556; 32 pages.

Bopp, et al.; "Systems and Methods for Blind-Mate Connector Alignment;" U.S. Appl. No. 12/366,258; 33 pages, filed Feb. 5, 2009.

Bopp, et al.; "Canister Housing;" U.S. Appl. No. 12/366,540; 31 pages, filed Feb. 5, 2009.

PCT, Notification of Transmittal of the International Search Report and the Written Opinion of the International Searching Authority, International Application No. PCT/US2009/033376, 15 pages, Nov. 19, 2009.

* cited by examiner

US 8,276,849 B2

APPARATUS FOR SUPPORTING INSTRUMENTS IN AN INSTRUMENT PANEL

RELATED APPLICATIONS

This application claims the benefit under 35 U.S.C. §119 (e) of U.S. Provisional Application No. 61/194,891 filed Sep. 30, 2008, entitled "F-16 Center Pedestal Display Housing."

TECHNICAL FIELD

This present disclosure relates generally to aircraft avionics and more particularly to an apparatus for supporting instruments in an instrument panel.

BACKGROUND

In some aircraft, such as F-16 fighter jets, F-15 fighter jets, F-22 fighter jets, and A-10 attack aircraft, a center instrument pedestal comprises components such as instruments, gauges, and/or switches that provide information and functionality to a pilot. For example, the components may comprise altimeters, airspeed indicators, directional gyroscopes, vertical velocity indicators, navigation mode selectors, and fuel switches.

SUMMARY

According to one embodiment, a bracket configured to hold a pressure transducer comprises a body, a face plate, and one or more pressure fitting connectors. The body has a rear portion and a front portion that meet to form an angle less than 180 degrees. The face plate is coupled to the front portion of the body, and has a surface defining a plate aperture configured for a cable to pass through. The pressure fitting connectors are coupled to the rear portion of the body. Each pressure fitting connector is configured to receive a pressure hose.

Various embodiments of the bracket may provide numerous advantages. In particular embodiments, the bracket may be installed from the cockpit side of a center instrument pedestal. In particular embodiments, the bracket fits within the openings of a center instrument pedestal without modification of the mounting block of the pedestal. In particular embodiments, the bracket may be coupled to components of the center instrument pedestal such as hoses. One or more embodiments may benefit from some, none, or all of the advantages discussed herein. Other technical advantages may become readily apparent to one of ordinary skill in the art after review of the following figures, description, and claims.

DETAILED DESCRIPTION

In some aircraft, such as F-16 fighter jets, F-15 fighter jets, F-22 fighter jets, and A-10 attack aircraft, a center instrument pedestal comprises components such as instruments, gauges, and/or switches that provide information and functionality to a pilot. Components may be removed and installed in order to replace failed components, upgrade existing capabilities, or add new capabilities. For example, analog components may be upgraded to digital components. As another example, new components may be added to upgrade an aircraft's situational awareness capabilities.

Replacing the components may involve removing old components and installing new components. In some embodiments, the new components may be installed in the existing center instrument pedestal without modifying the space and design parameters of the cockpit. Because the new components may have a different size and/or shape than the old components, a bracket may be used to hold the new components in a suitable position within the existing center instrument pedestal.

Embodiments of the present invention and its advantages are best understood by referring to FIGS. 1 through 8 of the drawings, like numerals being used for like and corresponding parts of the various drawings.

Figure 1:
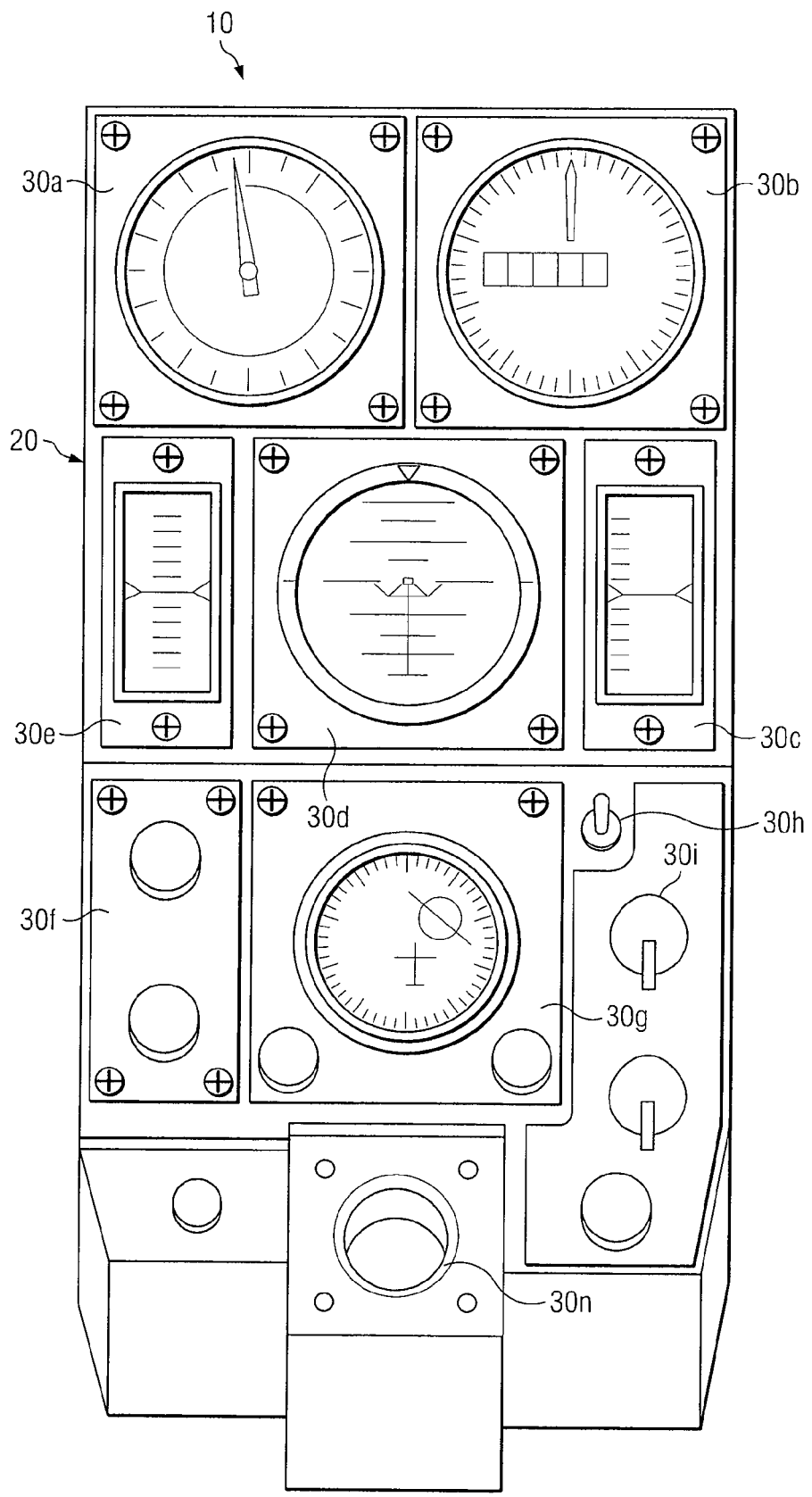
FIG. 1 illustrates an example of a center instrument pedestal of an aircraft according to some embodiments.

FIG. 1 illustrates an example of a front view of a center instrument pedestal 10 for an F-16 aircraft. In some embodiments, center instrument pedestal 10 comprises a mounting block 20 and components 30a-30n. For example, components 30 may comprise altimeters, airspeed indicators, directional gyroscopes, vertical velocity indicators, navigation mode selectors, and fuel switches. As illustrated in FIG. 1, components 30 comprise legacy components. It should be understood, however, that components 30 of mounting block 20 may be any type of components, such as new components, replacement components, legacy components, or a combination of any of the preceding. Replacement components may include components that substitute for other components, such as a digital component that may replace an analog component, or components used to replace a failed component, such as a component of the same type as the failed component.

Although FIG. 1 illustrates a particular embodiment that includes particular components that are each configured to provide certain functionality, alternative embodiments may include any appropriate combination of components with the described functionality divided between the components in any suitable manner. For example, alternative embodiments may comprise other types of aircraft. It should be understood that the dimensions may be different for other types of aircraft.

Figure 2:
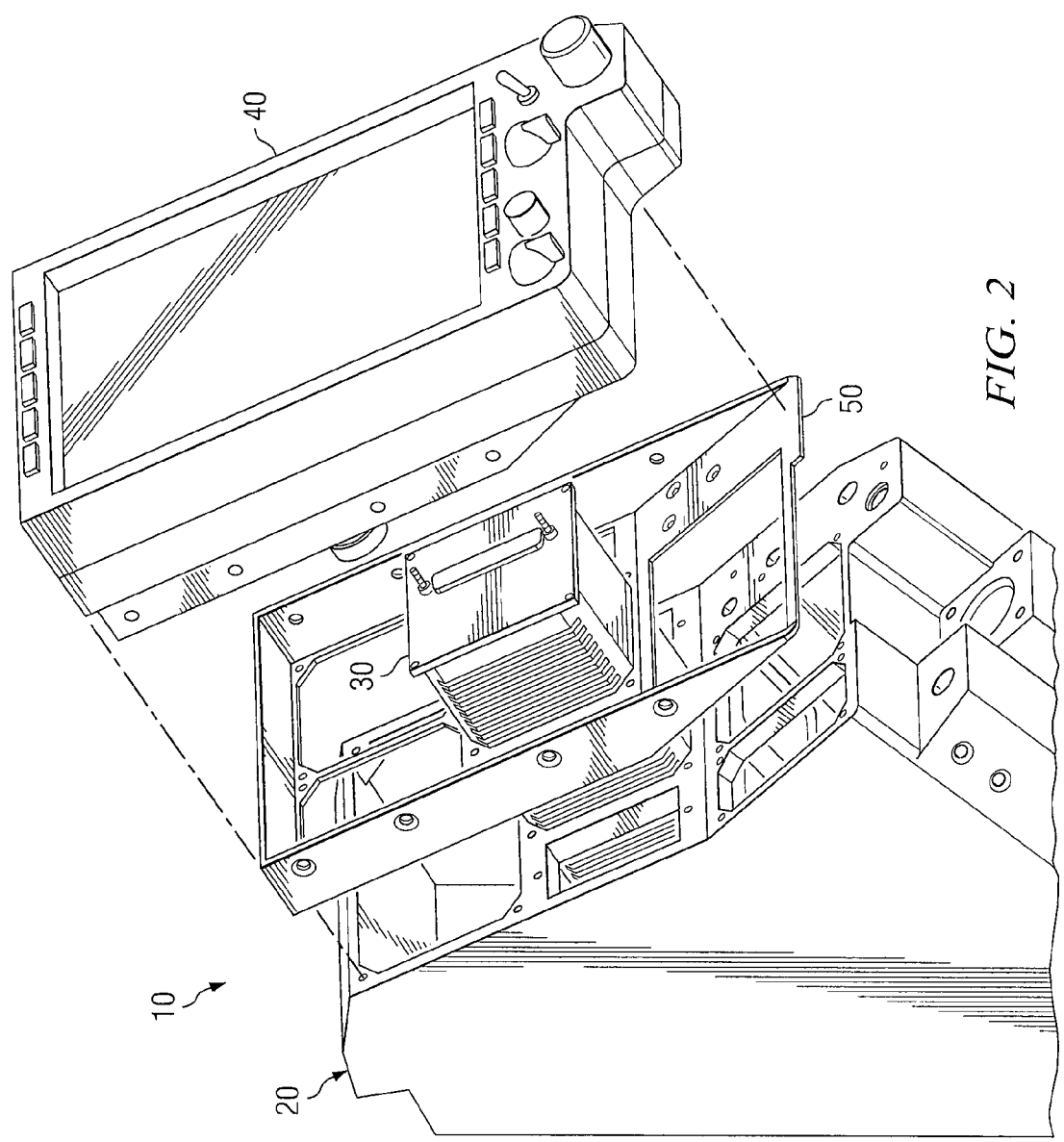
FIG. 2 illustrates an example of an isometric view of a center instrument pedestal comprising a mounting block according to some embodiments.

FIG. 2 illustrates an example of an isometric view of center instrument pedestal 10. As illustrated, center instrument pedestal 10 comprises mounting block 20, component 30, display head 40, and display adapter mount 50. In some embodiments, display head 40 may receive signals from components 30 and generate a display from the signals. For example, display head 40 may receive signals from instruments and generate a display of information. The information, such as altitude, airspeed, direction, vertical velocity, navigation maps, videos, and/or any other suitable information, may be used by a pilot operating an aircraft. Display adapter mount 50 may support display head 40. For example, display adapter mount 50 may be coupled on one side to mounting block 20 and on the other side to display head 40. In some embodiments, components 30 may be inserted into mounting block 20 through display adapter mount 50.

Figure 3:
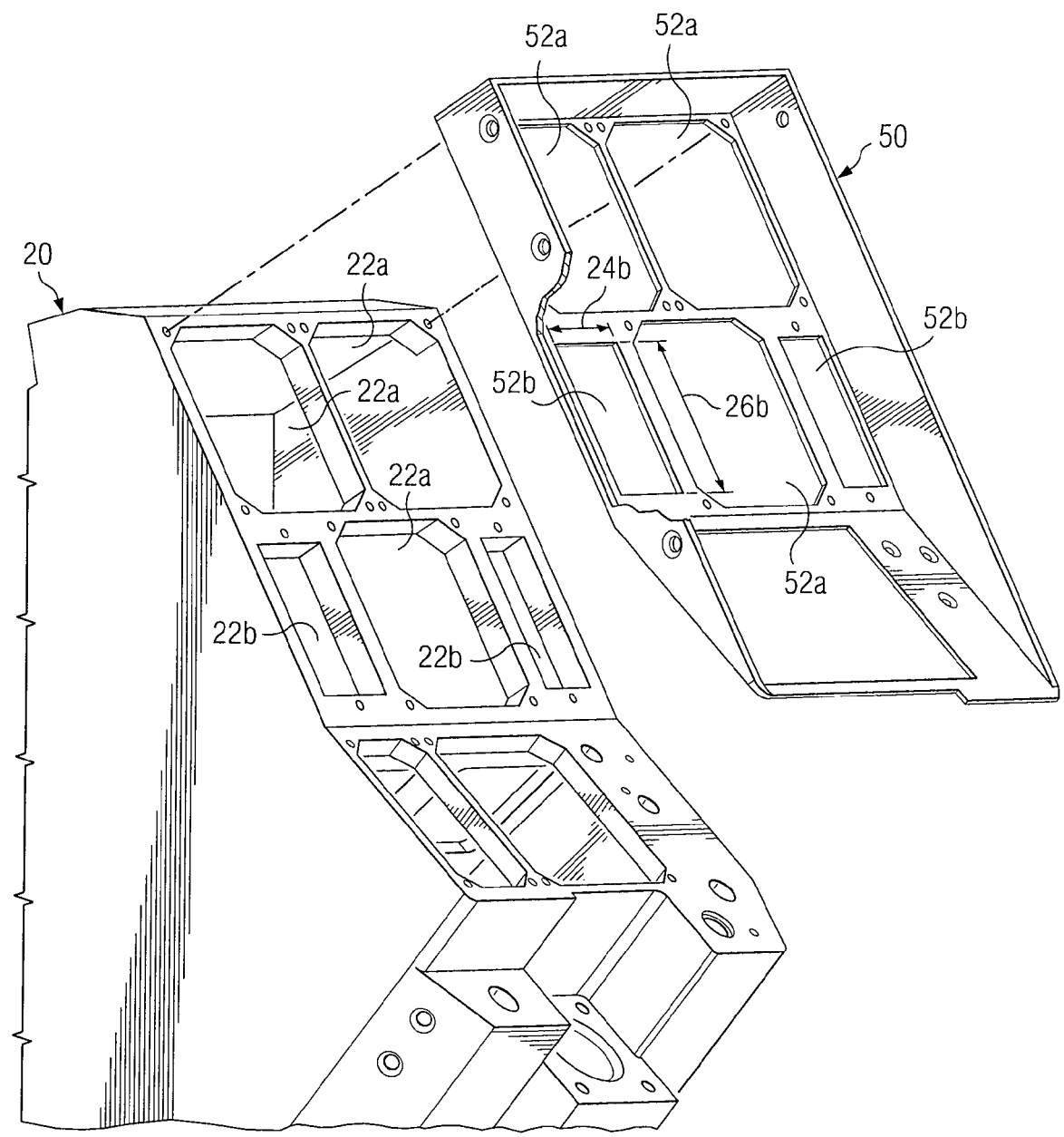
FIG. 3 illustrates an example of an isometric view of a mounting block configured to receive new components according to some embodiments.

FIG. 3 illustrates an example of a front view of mounting block 20 without components 30. As illustrated, mounting block 20 has a surface that defines a plurality of pedestal apertures 22 into which components may be inserted. In a standard F-16 mounting block, the dimension of pedestal apertures 22a may be approximately three to four inches square. The dimensions of pedestal aperture 22b may be a pedestal aperture width 24b of one to two inches and a pedestal aperture height 26b of three to four inches. In some embodiments, the front of mounting block 20 may face the cockpit of the aircraft and thus may be readily accessible to the pilot.

According to some embodiments, new components may be installed in mounting block 20. For example, a new component may be inserted in mounting block 20 through a pedestal aperture 22. In some embodiments, components may be inserted into pedestal apertures 22 through adapter mount apertures 52 defined by the surface of display adapter mount 50. In some embodiments, the size and position of an adapter mount aperture 52 may be substantially the same as the size and position of a pedestal aperture 22. For example, adapter mount aperture 52a may be substantially the same as pedestal aperture 22a and adapter mount aperture 52b may be substantially the same as pedestal aperture 22b.

In some embodiments, installing the new component through a pedestal aperture 22 and/or reusing mounting block 20 may allow the aircraft to be upgraded from within the cockpit without modifying the structure of the aircraft. However, installing the new component through a pedestal aperture 22 and/or reusing mounting block 20 may restrict the size, shape, and/or number of components that may be installed. Additionally, the new component may need to be located in a particular position to align with and/or connect to legacy equipment of a fixed size and/or in a fixed position within mounting block 20.

In some embodiments, a bracket may pass through a pedestal aperture 22 and fit in mounting block 20 to hold the new component in a suitable position within mounting block 20. In some embodiments, the bracket may be able to hold commercial off-the-shelf (COTS) components in a suitable position within mounting block 20.

Figure 4:
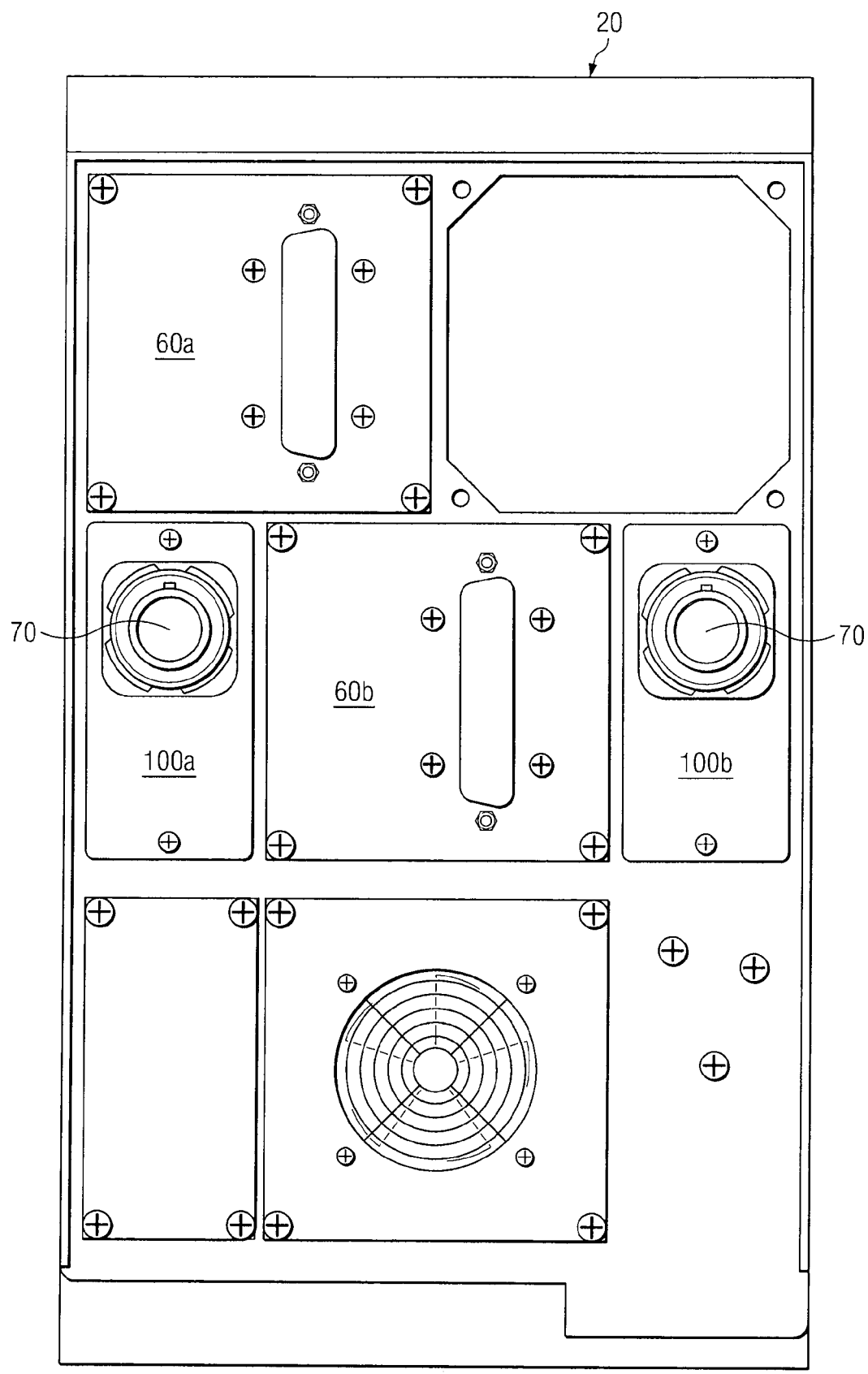
FIG. 4 illustrates an example of a front view of a mounting block and a bracket according to some embodiments.

FIG. 4 illustrates an example of a front view of a mounting block 20 populated with components. Pedestal apertures 22 may be left unpopulated or they may be populated with any suitable components. For example, pedestal aperture 22a may be populated with a canister 60 and pedestal aperture 22b may be populated with a bracket 100.

Canister 60 may generally provide a platform to host digital flight instruments and/or enhanced processing capabilities for mission planning and/or control. Such flight instruments and/or processing capabilities may provide feedback and/or situational awareness capabilities that may or may not be offered by legacy instruments 30. Accordingly, canister 60 may provide additional or different capabilities over legacy flight instruments, while maintaining space and design parameters for an aircraft cockpit. Embodiments of canister 60 may be installed in the existing center instrument pedestal without modifying the structure of the aircraft. Specifically, the dimensions of canister 60 may be such that canister 60 may fit through a pedestal aperture 22 of mounting block 20. Thus, embodiments of canister 60 may permit an aircraft to be upgraded from within the cockpit. Additionally, embodiments of canister 60 may be designed such that installing canister 60 does not significantly alter the weight and/or center of gravity of a loaded center instrument pedestal. Canister 60 may also be designed using existing shock and vibration requirements for F-16 multi-function display (MFD).

In some embodiments, canisters 60 may be installed to provide certain functionality. For example, a particular canister 60 may provide processing capabilities and comprise a primary flight reference (PFR) unit or an image capture unit (ICU). As another example, a canister 60 may function to provide power to a center instrument pedestal and comprise a power distribution unit (PDU). As is described below, these canisters may vary in size from each other and may contain different components.

In certain embodiments, a bracket 100 may be used to support and/or couple components, such as existing components to replacement components. In some embodiments, bracket 100 may be configured to allow a cable, such as a display connector 70, to pass through bracket 100 so that the cable may connect to a component of center instrument pedestal 10, such as display head 40. For example, display connector 70 may be configured to provide power to display head 40 and/or to carry electrical signals to and from components of display head 40. In some embodiments, a first bracket 100a may be configured as an airspeed bracket and a second bracket 100b may be configured as an altimeter bracket. For example, an airspeed bracket may be coupled to a pressure transducer configured to generate signals related to the speed of an aircraft and an altimeter bracket may be coupled to a pressure transducer configured to generate signals related to the altitude of the aircraft.

Figure 5:
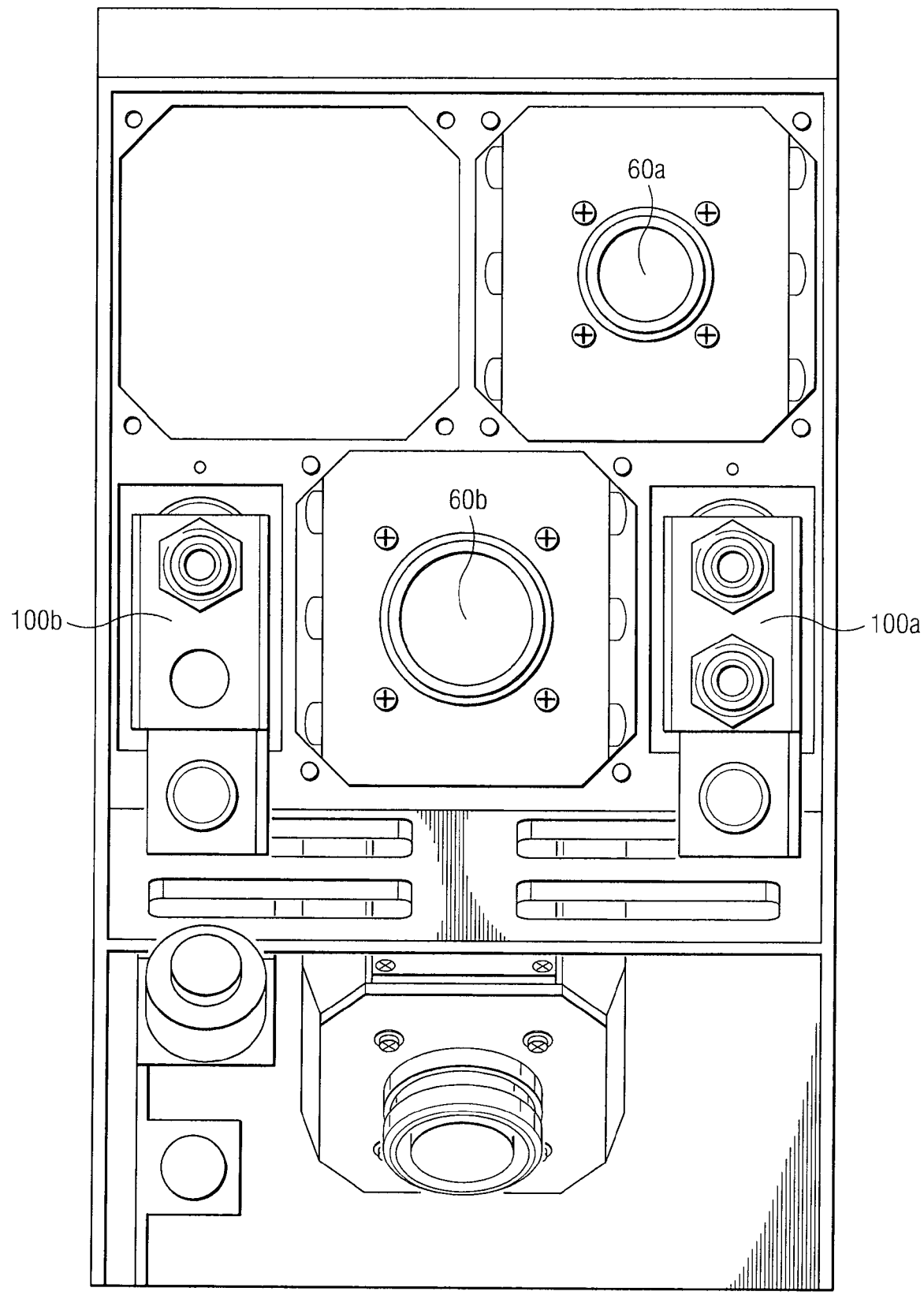
FIG. 5 illustrates an example of a rear view of a mounting block and a bracket according to some embodiments.
Figure 6:
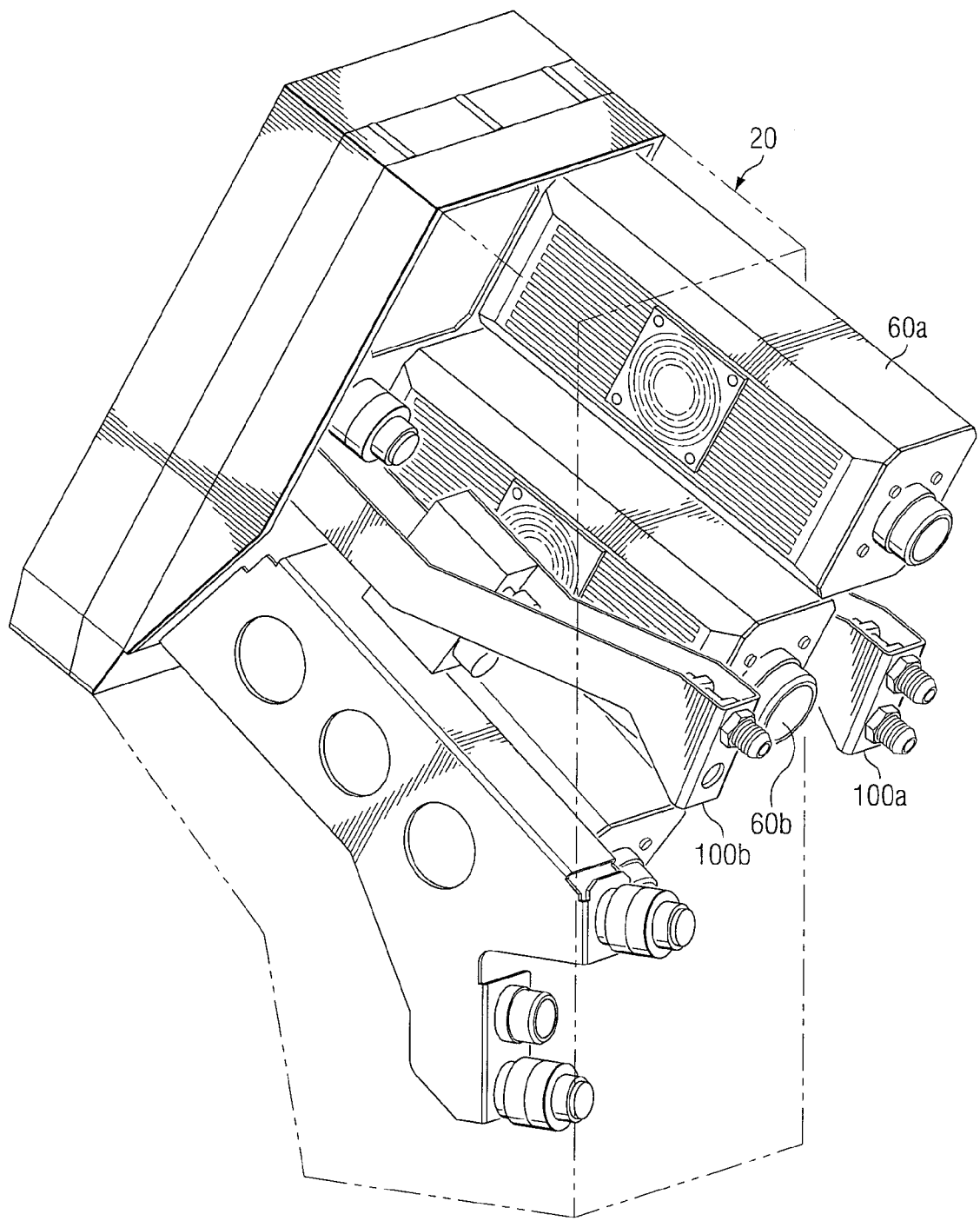
FIG. 6 illustrates an example of an isometric view of a side view of a mounting block and a bracket according to some embodiments.

FIG. 5 and FIG. 6 illustrate a rear view and an isometric side view, respectively, of the example mounting block 20 illustrated by FIG. 4. Although FIGS. 4, 5, and 6 illustrate a particular embodiment that includes particular components that are each configured to provide certain functionality, alternative embodiments may include any appropriate combination of components with the described functionality divided between the components in any suitable manner.

Figure 7:
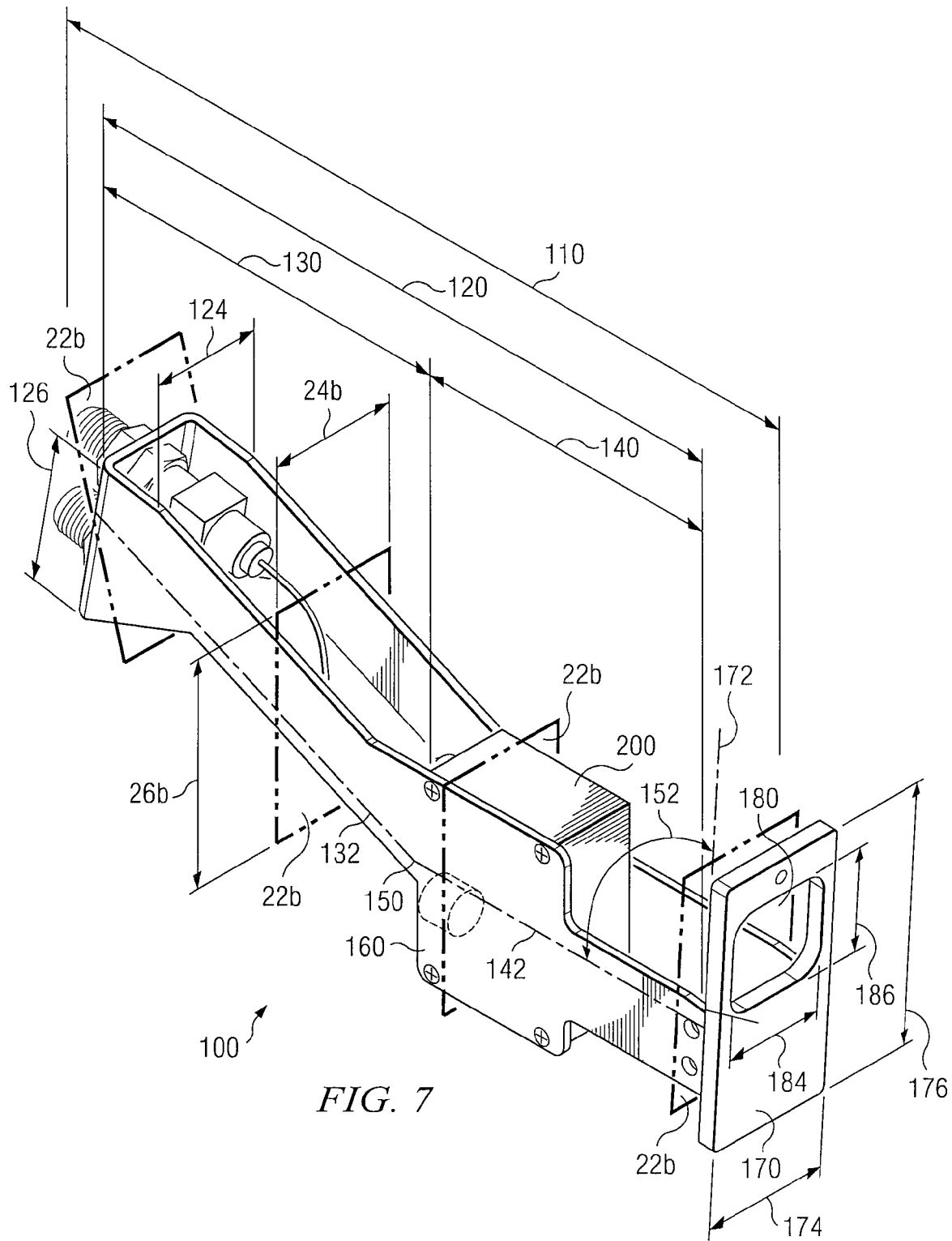
FIG. 7 illustrates an example of an isometric view of a bracket configured to couple a pressure transducer to a component of a mounting block according to some embodiments.

FIG. 7 illustrates an example of bracket 100 according to some embodiments. In some embodiments, bracket 100 may be shaped to fit through a pedestal aperture 22b of mounting block 20. For example, bracket 100 may have a bend that allows bracket 100 to pass through a pedestal aperture 22b and fit around components and structures of the pedestal (not shown). In some embodiments, inserting bracket 100 through a pedestal aperture 22b may allow bracket 100 to be installed from the front of the pedestal. Bracket 100 may be made of any suitable material. For example, bracket 100 may comprise aluminum alloy, titanium alloy, zinc alloy, corrosion resistant steel, or other any similar metallic material.

According to some embodiments, bracket 100 may have bracket length 110. Bracket length 110 may be selected to allow bracket 100 to fit into a chamber of mounting block 20 and/or to allow bracket 100 to connect to components within mounting block 20. For example, bracket length 110 may range from approximately eight to twelve inches, such as approximately ten inches.

In some embodiments, bracket 100 may comprise a body 120 with a body width 124 and a body height 126. The dimensions of body 120 may be selected to fit through a pedestal aperture 22b. That is, body width 124 may be less than pedestal aperture width 24b and body height 126 may be less than pedestal aperture height 26b for all points along body 120.

In some embodiments, body 120 may comprise a rear portion 130 having a rear portion axis 132 and a front portion 140 having a front portion axis 142. The rear portion axis 132 and the front portion axis 142 may intersect to form an angle 150. In some embodiments, angle 150 may be less than 180 degrees such as 90 to 175 degrees, for example about 155 degrees. In some embodiments, front portion 140 may comprise a brace 160 configured to hold a component in mounting block 20. For example, brace 160 may be configured to hold a pressure transducer 200. Pressure transducer 200 may be configured to provide pressure measurements that may be used to determine the altitude or airspeed of the aircraft, for example. In some embodiments, pressure transducer 200 may be a COTS pressure transducer.

According to some embodiments, bracket 100 may comprise a face plate 170. Face plate 170 may be coupled to the front portion 140 of body 120. Face plate 170 and body 120 may be two separate pieces of metal or one continuous piece of metal. The dimensions of face plate 170 may be selected to substantially overlap a pedestal aperture 22b. For example, face plate 170 may have a face plate width 174 of approximately one to two inches, such as 1.6 inches, and a face plate height 176 of approximately two to four inches, such as 3.325 inches.

In some embodiments, the surface of face plate 170 defines a plate aperture 180. Plate aperture 180 may be located on face plate 170 such that angle 150 angles rear portion 130 towards plate aperture 180. In some embodiments, face plate 170 may be coupled to body 120 at a face plate angle 152 such that plate aperture 180 angles away from body 120. For example, a face plate axis 172 may intersect front portion axis 142 of body 120 at face plate angle 152. In some embodiments, face plate angle 152 may range from 90 to 110 degrees, such as approximately 99 degrees.

Plate aperture 180 has plate aperture width 184 and plate aperture height 186. Plate aperture width 184 and plate aperture height 186 may be selected to allow a cable, such as display connector 70 of FIG. 4, to pass through. For example, plate aperture width 184 and plate aperture height 186 may each range from about one to two inches, such as 1.34 inches.

In some embodiments, mounting block 20 may comprise a cable, such as display connector 70 of FIG. 4, which may pass through bracket 100 at plate aperture 180. In some embodiments, bracket 100 may be shaped to allow sufficient room within mounting block 20 to accommodate the display connector and its connections. In some embodiments, the display connector and its connections may pass pressure transducer 200 along the side of pressure transducer 200 that runs substantially parallel to front portion axis 142 and that is located on the same side of front portion axis 142 as plate aperture 180. The length of front portion 140 of bracket 100 may be selected to position pressure transducer 200 on bracket 100 to allow the display connector and its connections to pass. For example, front portion 140 of bracket 100 may range in length from three to five inches, such as about 4.2 inches. In some embodiments, the direction of angle 150 may be such that rear portion 130 of bracket 100 angles toward plate aperture 180. In some embodiments, the direction of angle 150 may allow the display connector and its connections to pass pressure transducer 200 with approximately a 45 degree backshell.

Although FIG. 7 illustrates a particular embodiment that includes particular components that are each configured to provide certain functionality, alternative embodiments may include any appropriate combination of components with the described functionality divided between the components in any suitable manner. For example, bracket 100 may be shaped to maintain suitable structural integrity when exposed to aircraft crash loads.

Figure 8:
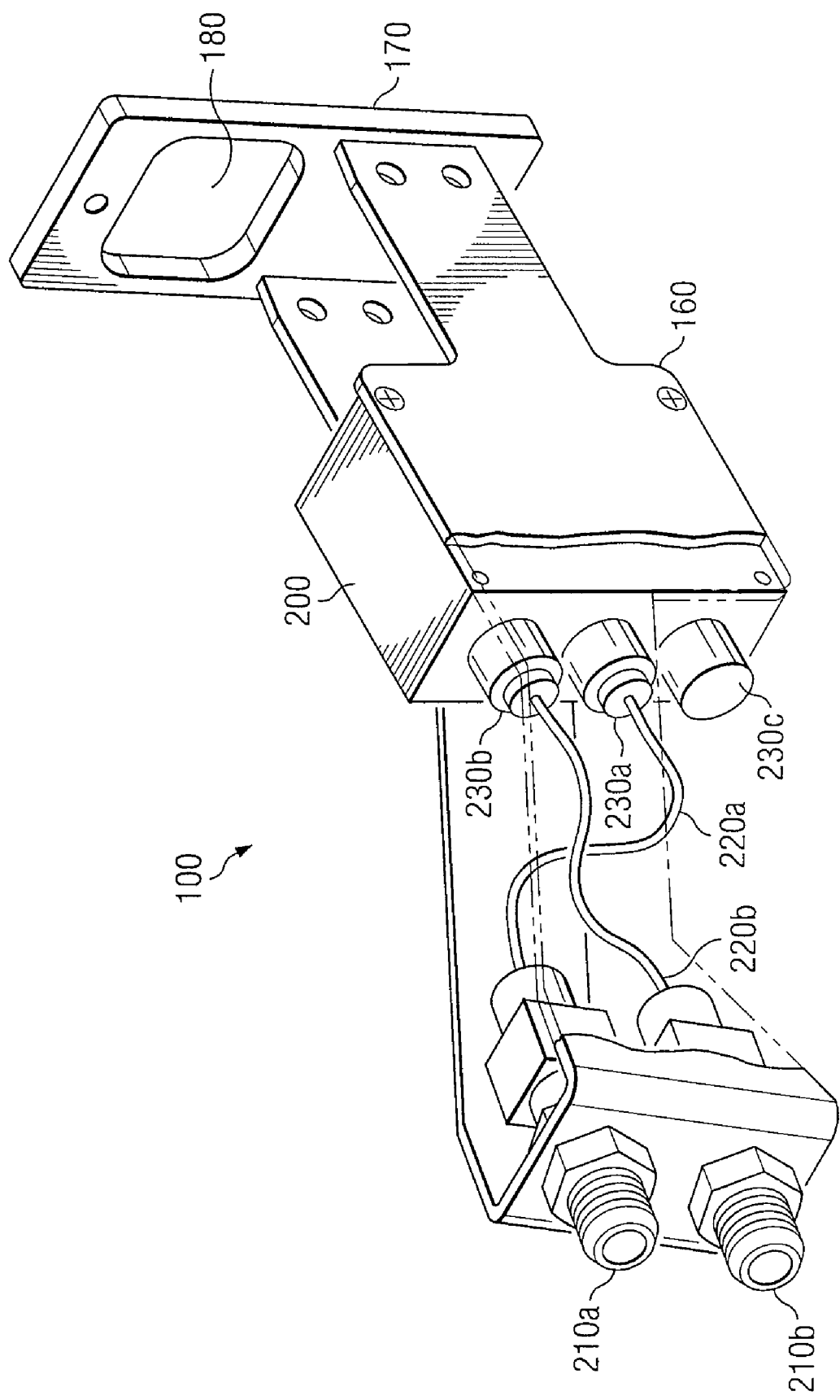
FIG. 8 illustrates another example of an isometric view of a bracket configured to couple a pressure transducer to a component of a mounting block according to some embodiments.

FIG. 8 illustrates an example of bracket 100 configured to couple pressure transducer 200 to a component (not shown) of mounting block 20. In some embodiments, mounting block 20 may comprise pressure hoses, which may be legacy pressure hoses. The pressure hoses may be fixed in length. In some embodiments, bracket 100 may position pressure transducer 200 to allow pressure transducer 200 to connect to the pressure hoses. For example, rear portion 130 of bracket 100 may be coupled to a pressure fitting connector 210 that may connect on one side to a pressure hose and on the other side to a pressure hose extension 220. Pressure hose extension 220 may allow pressure from the pressure hose to travel to a connector 230 of pressure transducer 200. In some embodiments, the diameter of pressure hose extension 220 may range from approximately 1/16 to 1/4 inches, and the material comprising pressure hose extension 220 may be semi-rigid.

In some embodiments, pressure fitting connector 210 may be coupled to bracket 100 such that a central axis of pressure fitting connector 210 may intersect an axis of face plate 170 running perpendicular to face plate height 176 at an angle that measures in the range of 150 to 180 degrees, such as 174 degrees.

In some embodiments, mounting block 20 may comprise two brackets 100. A first bracket 100 may be configured as an airspeed bracket such as bracket 100a of FIGS. 4-6. A second bracket 100 may be configured as an altimeter bracket such as bracket 100b of FIGS. 4-6.

Referring to FIG. 8, bracket 100 configured as an airspeed bracket may comprise two pressure fitting connectors 210. For example, pressure fitting connector 210a may connect to a static pressure hose on one side and to pressure hose extension 220a on the other side. Pressure hose extension 220a may run from pressure fitting connector 210a to a static pressure connector 230a of pressure transducer 200. Pressure fitting connector 210b may connect to a pitot pressure hose on one side and to pressure hose extension 220b on the other side. Pressure hose extension 220b may run from pressure fitting connector 210b to a pitot pressure connector 230b of pressure transducer 200.

In some embodiments, bracket 100 configured as an altimeter bracket may comprise one pressure fitting connector 210. For example, pressure fitting connector 210a may connect to a static pressure hose on one side and to pressure hose extension 220a on the other side. Pressure hose extension 220a may run from pressure fitting connector 210a to a static pressure connector 230a of pressure transducer 200.

In some embodiments, pressure transducer 200 may receive power from and/or send electrical signals to a wiring harness. For example, pressure transducer 200 may be coupled to the wiring harness at connector 230c. The signals sent from pressure transducer 200 to the wiring harness may indicate the pressure received from the pressure hoses. The wiring harness may carry the electrical signals to a canister, such as canister 60 of FIGS. 4-6, where they may be interpreted to generate airspeed and/or altitude data. The canister may send the data to display head 40 to be displayed.

Although FIG. 8 illustrates a particular embodiment that includes particular components that are each configured to provide certain functionality, alternative embodiments may include any appropriate combination of components with the described functionality divided between the components in any suitable manner.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. An apparatus comprising:
   a body comprising:
      a rear portion having a rear portion axis; and
      a front portion having a front portion axis, the front portion axis and the rear portion axis forming an angle greater than zero degrees but less than 180 degrees, the front portion comprising a brace configured to hold a pressure transducer;
   a face plate coupled to the front portion, the face plate having a surface defining a plate aperture configured for a cable to pass through; and
   one or more pressure fitting connectors coupled to the rear portion and the pressure transducer, each of the one or more pressure fitting connectors configured to receive a pressure hose.

2. The apparatus of claim 1, further configured to be installed into and removed from an instrument pedestal of an aircraft cockpit, the instrument pedestal comprising a plurality of pedestal apertures, the pedestal apertures facing the aircraft cockpit, the installation and removal done from the pedestal apertures.

3. The apparatus of claim 1, the body having:
   a body height less than a pedestal aperture height; and
   a body width less than a pedestal aperture width.

4. The apparatus of claim 1, the body having:
   a body height less than 3 inches; and
   a body width less than 2 inches; a body width less than 2 inches.

5. The apparatus of claim 1, the cable comprising a display connector.

6. The apparatus of claim 1, the angle angling the rear portion towards the plate aperture.

7. The apparatus of claim 1, the angle being between 135 and 175 degrees.

8. The apparatus of claim 1, the one or more pressure fitting connectors comprising:
   a pressure fitting connector configured to receive a static pressure hose.

9. The apparatus of claim 1, the one or more pressure fitting connectors comprising:
   a first pressure fitting connector configured to receive a static pressure hose; and
   a second pressure fitting connector configured to receive a pitot pressure hose.

10. The apparatus of claim 1, the bracket having a bracket length between 8 to 12 inches.

11. The apparatus of claim 1, the face plate having:
    a face plate height between 2 to 4 inches; and
    a face plate width between 1 to 2 inches.

12. The apparatus of claim 1, the pressure hose extension having a diameter of 1/16 to 1/4 inches.

13. The apparatus of claim 1, the bracket further comprising aluminum alloy, titanium alloy, zinc alloy, or corrosion resistant steel.

14. An avionics instrument pedestal comprising:
    an altimeter bracket and an airspeed bracket, the altimeter bracket and the airspeed bracket each comprising:
    a body comprising:
       a rear portion having a rear portion axis; and
       a front portion having a front portion axis, the front portion axis and the rear portion axis forming an angle greater than zero degrees but less than 180 degrees, the front portion comprising a brace configured to hold a pressure transducer;
    a face plate coupled to the front portion, the face plate having a surface defining a plate aperture configured for a cable to pass through; and
    one or more pressure fitting connectors coupled to the rear portion and the pressure transducer, each of the one or more pressure fitting connectors configured to receive a pressure hose.

15. The avionic instrument pedestal of claim 14, the one or more pressure fitting connectors of the altimeter bracket further comprising:
    a pressure fitting connector configured to receive a static pressure hose.

16. The avionic instrument pedestal of claim 14, the one or more pressure fitting connectors of the airspeed bracket further comprising:
    a first pressure fitting connector configured to receive a static pressure hose; and
    a second pressure fitting connector configured to receive a pitot pressure hose.

17. The avionic instrument pedestal of claim 14, the altimeter bracket and the airspeed bracket each having:
    a body height less than a pedestal aperture height; and
    a body width less than a pedestal aperture width.

18. The avionic instrument pedestal of claim 14, the cable comprising a display connector.

19. The avionic instrument pedestal of claim 14, the angle angling the rear portion towards the plate aperture.

20. A method comprising:
    installing an apparatus into an instrument pedestal of an aircraft, the instrument pedestal comprising a plurality of pedestal apertures, the pedestal apertures facing a cockpit of the aircraft, the apparatus comprising:
    a body comprising:
       a rear portion having a rear portion axis; and
       a front portion having a front portion axis, the front portion axis and the rear portion axis forming an angle greater than zero degrees but less than 180 degrees, the front portion comprising a brace configured to hold a pressure transducer;
    a face plate coupled to the front portion, the face plate having a surface defining a plate aperture configured for a cable to pass through; and
    one or more pressure fitting connectors coupled to the rear portion and the pressure transducer, each of the one or more pressure fitting connectors configured to receive a pressure hose; and
    inserting the apparatus into a particular one of the plurality of pedestal apertures.

* * * * *